US010922409B2

(12) United States Patent
Wang et al.

(10) Patent No.: US 10,922,409 B2
(45) Date of Patent: Feb. 16, 2021

(54) DEEP REINFORCEMENT LEARNING TECHNOLOGIES FOR DETECTING MALWARE

(71) Applicant: MICROSOFT TECHNOLOGY LICENSING, LLC, Redmond, WA (US)

(72) Inventors: Yu Wang, Sunnyvale, CA (US); Jack Wilson Stokes, III, North Bend, WA (US); Adrian Mihail Marinescu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 15/949,873

(22) Filed: Apr. 10, 2018

(65) Prior Publication Data
US 2019/0311119 A1 Oct. 10, 2019

(51) Int. Cl.
| | |
|---|---|
| *G06F 21/00* | (2013.01) |
| *G06F 21/56* | (2013.01) |
| *G06N 3/00* | (2006.01) |
| *H04L 29/06* | (2006.01) |
| *G06N 3/08* | (2006.01) |
| *G06N 3/04* | (2006.01) |

(52) U.S. Cl.
CPC .......... *G06F 21/566* (2013.01); *G06N 3/006* (2013.01); *G06N 3/0445* (2013.01); *G06N 3/08* (2013.01); *H04L 63/14* (2013.01); *G06F 2221/034* (2013.01)

(58) Field of Classification Search
CPC . G06F 21/566; G06F 2221/034; G06N 3/006; G06N 3/0445; G06N 3/08; H04L 63/14
See application file for complete search history.

(56) References Cited

U.S. PATENT DOCUMENTS

| | | | |
|---|---|---|---|
| 9,705,904 B1* | 7/2017 | Davis | G06F 21/562 |
| 10,452,847 B2 | 10/2019 | Tolpin et al. | |
| 10,701,089 B2* | 6/2020 | Paine | G06F 21/552 |
| 2004/0019650 A1 | 1/2004 | Auvenshine | |
| 2010/0082513 A1 | 4/2010 | Liu | |
| 2010/0333167 A1 | 12/2010 | Luo et al. | |

(Continued)

OTHER PUBLICATIONS

Anderson, H., Kharkar, A., Filar, B., Evans, D., Roth, P. (2018). "Learning to evade static PE machine learning malware models via reinforcement learning". Jan. 30, 2018. https://arxiv.org/pdf/1801.08917.pdf (Year: 2018).*

(Continued)

*Primary Examiner* — Mahfuzur Rahman
(74) *Attorney, Agent, or Firm* — Shook, Hardy & Bacon L.L.P.

(57) ABSTRACT

Technologies for detecting malware based on reinforcement learning model to detect whether a file is malicious or benign and to determine the best time to halt the file's execution in so detecting. The reinforcement learning model combined with an event classifier and a file classifier learns whether to halt execution after enough state information has been observed or to continue execution if more events are needed to make a highly confident determination. The algorithm disclosed allows the system to decide when to stop on a per file basis.

20 Claims, 9 Drawing Sheets

(56) References Cited

U.S. PATENT DOCUMENTS

| | | | | |
|---|---|---|---|---|
| 2014/0090061 | A1* | 3/2014 | Avasarala | G06F 21/56 726/24 |
| 2016/0042179 | A1* | 2/2016 | Weingarten | G06F 21/566 726/23 |
| 2016/0232445 | A1 | 8/2016 | Srinivasan et al. | |
| 2017/0262633 | A1* | 9/2017 | Miserendino | G06F 21/566 |
| 2018/0082060 | A1 | 3/2018 | Tolpin et al. | |
| 2018/0255076 | A1* | 9/2018 | Paine | H04L 63/1433 |
| 2018/0255079 | A1* | 9/2018 | Paine | H04L 63/1433 |
| 2019/0205530 | A1* | 7/2019 | Brown | G06F 21/53 |
| 2019/0207969 | A1* | 7/2019 | Brown | G06F 16/24568 |
| 2019/0332769 | A1 | 10/2019 | Fralick et al. | |
| 2019/0362074 | A1* | 11/2019 | Wang | G06N 3/006 |
| 2019/0392140 | A1* | 12/2019 | Kawakita | G06F 16/00 |

OTHER PUBLICATIONS

Matiisen, Tambet (Dec. 19, 2015). "Demystifying Deep Reinforcement Learning". Computational Neuroscience Lab. https://neuro.cs.ut.ee/demystifying-deep-reinforcement-learning/ (Year: 2015).*

Van Hasselt, H., Guez, A., and Silver, D. (2015). Deep Reinforcement Learning with Double Q-learning. Comput. Sci. 2015, ArXiv: 1509.06461. (Year: 2015).*

X. Wan, G. Sheng, Y. Li, L. Xiao and X. Du, "Reinforcement Learning Based Mobile Offloading for Cloud-Based Malware Detection," GLOBECOM 2017—2017 IEEE Global Communications Conference, Singapore, 2017, pp. 1-6. (Year: 2017).*

Kolosnjaji B., Zarras A., Webster G., Eckert C. (2016) Deep Learning for Classification of Malware System Call Sequences. In: Kang B., Bai Q. (eds) AI 2016: Advances in Artificial Intelligence. AI 2016. Lecture Notes in Computer Science, vol. 9992. Springer, Cham (Year: 2016).*

Anderson, "Bot vs. Bot: Evading Machine Learning Malware Detection", black hat® USA 2017, Las Vegas, NV, Jul. 22-27, 2017, 21 pages.

"GitHub—endgameinc/gym-malware", Retrieved from https://github.com/endgameinc/gym-malware, Retrieved Date: Nov. 9, 2017, 3 Pages.

"OpenAI Gym", Retrieved from https://gym.openai.com/envs/Breakout-v0, Retrieved Date: Nov. 9, 2017, 6 Pages.

Athiwaratkun, et al., "Malware classification with Lstm and Gru language models and A Character-level CNN", In Proceedings of IEEE International Conference on Acoustics, Speech and Signal Processing, Mar. 5, 2017, pp. 2482-2486.

Gershgorn, Dave, "Fooling the Machine", Retrieved from http://www.popsci.com/byzantine-science-deceiving-artificial-intelligence, Mar. 30, 2016, 6 Pages.

Kaelbling, et al., "Reinforcement learning: A survey", In Journal of Artificial Intelligence Research, vol. 4, May 1996, pp. 237-285.

Kolosnjaji, et al., "Deep learning for classification of malware system call sequences", In Proceedings of Australasian Joint Conference on Artificial Intelligence, Dec. 5, 2016, pp. 1-12.

Littman, Michael L., "Markov games as a framework for multi-agent reinforcement learning", In Proceedings of the eleventh international conference on machine learning, vol. 157, Jul. 10, 1994, 7 Pages.

Mnih, et al., "Human-level control through deep reinforcement learning", In Journal of Nature, vol. 518, Feb. 26, 2015, pp. 529-533.

Mnih, et al., "Playing atari with deep reinforcement learning", In Journal of the Computing Research Repository, Dec. 2013, pp. 1-9.

Narendra, et al., "Identification and control of dynamical systems using neural networks", In Journal of IEEE Transactions on neural networks, vol. 1, Issue 1, Mar. 1990, pp. 4-27.

Pascanu, et al., "Malware classification with recurrent networks", In Proceedings of IEEE International Conference pn Acoustics, Speech and Signal Processing, Apr. 19, 2015, 5 Pages.

"International Search Report & Written Opinion for PCT Application No. PCT/US19/023951", dated May 3, 2019, 14 Pages.

Sutton, Rich., "Introduction to reinforcement learning", In Publication of MIT Press, Mar. 1998, 20 Pages.

Sutton, Richard Stuart., "Temporal credit assignment in reinforcement learning", In doctoral dissertation of University of Massachusetts Amherst, Jan. 1984, 3 Pages.

Wang, Yu, "A new concept using LSTM neural networks for dynamic system identification", In Proceedings of IEEE American Control Conference, May 24, 2017, 8 Pages.

Williams, Ronald J., "Simple statistical gradient-following algorithms for connectionist reinforcement learning", In Journal of Machine Learning, vol. 8, Issue 3-4, May, 1992, pp. 229-256.

"Deep Reinforcement Learning", Retrieved from https://en.wikipedia.org/wiki/Deep_reinforcement_learning, Retrieved on Jul. 9, 2019, 1 Page.

"Long Short-Term Memory", Retrieved from https://en.wikipedia.org/wiki/Long_short-term_memory, Retrieved on Jul. 9, 2019, 12 Pages.

"Softmax Function", Retrieved from https://en.wikipedia.org/w/index.php?title=Softmax_function&oldid=753323509, Dec. 6, 2016, 3 Pages.

"International Search Report and Written Opinion Issued in PCT Application No. PCT/US19/032073", dated Jul 17, 2019, 14 Pages.

"Non-Final Office Action Issued in U.S. Appl. No. 15/988,798", dated May 6, 2020, 9 Pages.

"Final Office Action Issued in U.S. Appl. No. 15/988,798", dated Nov. 17, 2020, 10 Pages.

\* cited by examiner

DEEP REINFORCEMENT LEARNING TECHNOLOGIES FOR DETECTING MALWARE

BACKGROUND

Despite decades of research in computer security and tools to eliminate security threats, users and organizations continue to rely on commercial malware products that try to detect malware using a few main tactics. First, static analysis based on malware "signatures" is used to search files or processes for malicious code sequences. Next, dynamic analysis is used to emulate execution of a file, often in an isolated space. Such emulation may not involve a full virtual machine ("VM"). Instead, an emulator may mimic the response of a typical operating system. If the system can detect malicious behavior when emulating the file, the system may block execution on the native operating system and identify the file as malicious. As a result, infection of the computer can be avoided. If the system cannot detect malicious behavior during emulation, the file may be installed and/or executed on the computer. After installation, the malware system typically continues to monitor the dynamic behavior of the file whenever it is executed on the computer. If the malware system detects a malware file on the computer, it typically takes one or more actions to protect the computer from that file.

SUMMARY

The summary provided in this section summarizes one or more partial or complete example embodiments of the technologies described herein in order to provide a basic high-level understanding to the reader. This summary is not an extensive description of the technologies and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiments) or example(s) or combination(s) thereof provided herein.

The computer-related technologies disclosed here are largely directed to a novel invention, based on deep reinforcement learning ("DRL"), to detect the best time to halt a file's execution in order to determine whether a file is malicious or benign. The resulting DRL neural network ("NN"), combined with an event classifier and a file classifier, learns whether to halt emulation after enough state information has been observed or to continue execution if more events are needed to make a highly confident determination. Unlike previously proposed solutions, the DRL algorithm disclosed here allows the system to decide when to stop executing on a per file basis. By doing so, this invention is a step towards the use of artificial intelligence in the critically important area of cybersecurity.

For example, results from analyzing a collection of malware and benign files by the deep reinforcement learning system demonstrate a significant improvement in overall classification of an unknown file. At a false positive rate of 1.0%, the proposed deep reinforcement learning system increases the true positive detection rate by a significant 30.6%.

One of the weaknesses of these earlier systems is that they use fixed-length event sequences to make the decision to stop or halt execution of a file. In this invention, a new deep reinforcement learning approach is used to decide a better execution halting point with good confidence, which helps the anti-malware system learn to be more flexible in the needed length of event sequences.

Reinforcement learning is a special type of machine learning approach that uses the concept of stochastic optimization. It intends to solve an optimization problem such that an agent will take actions in the stochastic environment so as to maximize some notion of cumulative reward. In one example of this invention, the environment is defined as the malware files to be screened, the agent is defined as the antimalware system, and the reward is defined in a manner that the agent can be trained to be as smart as possible in choosing between two actions: continue file execution (because the file is determined to be benign) or halt file execution (because the file is determined to be malicious) by maximizing its expected reward.

DESCRIPTION OF THE DRAWINGS

The detailed description provided below will be better understood when considered in connection with the accompanying drawings, where.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the disclosed technologies, but is not intended to describe all possible embodiments of the technologies. This detailed description sets forth various examples of at least some of the systems and/or methods of the disclosed technologies. However, similar or equivalent technologies, systems, and/or methods may be realized according to other examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
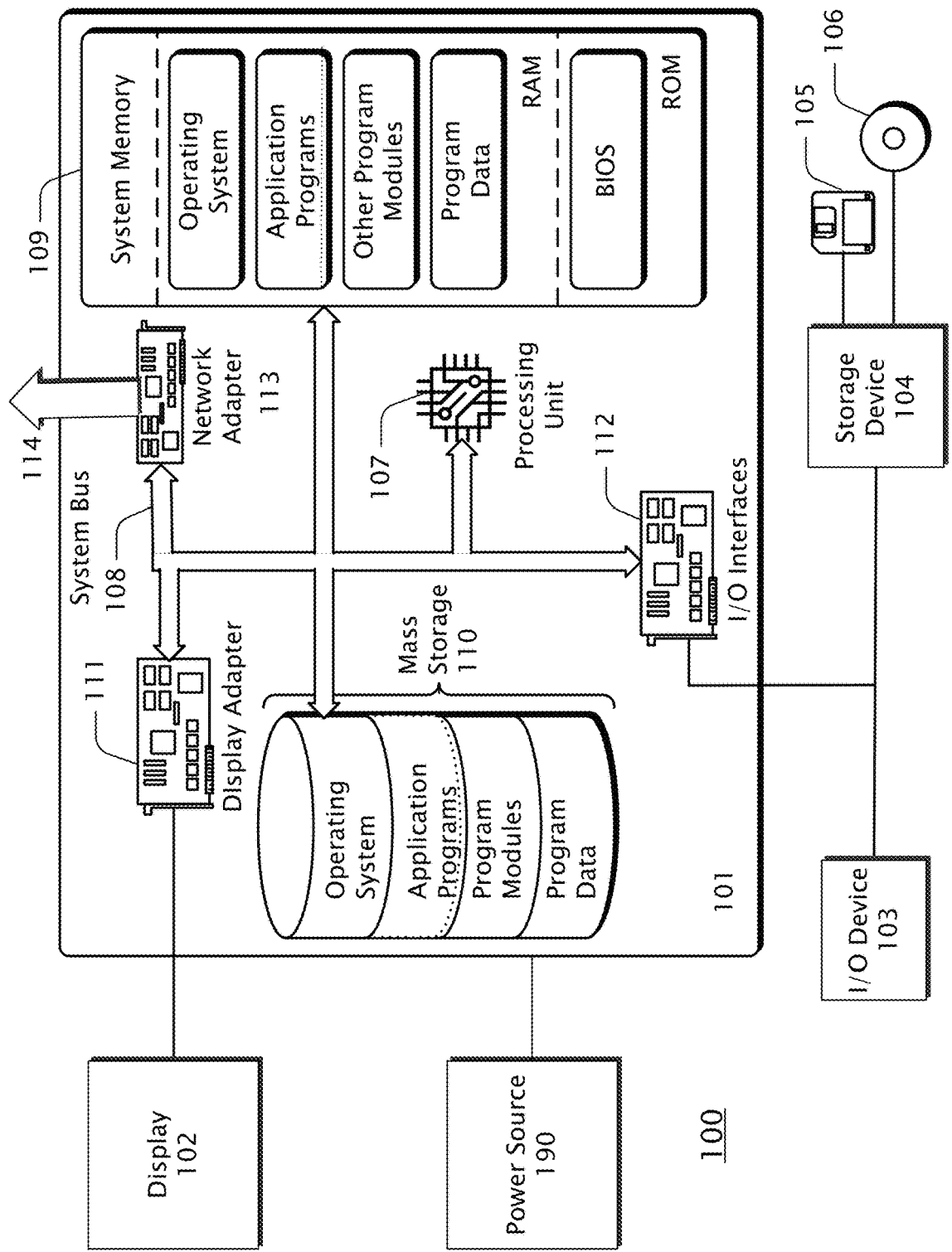
FIG. 1 is a block diagram showing an example computing environment 100 in which the technologies described herein may be implemented.

FIG. 1 is a block diagram showing an example computing environment 100 in which the technologies described herein may be implemented. A suitable computing environment may be implemented with any of numerous general purpose or special purpose devices and/or systems. Examples of such devices/systems include, but are not limited to, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes at least one computing device 101 coupled to various components, such as peripheral devices 102, 103, 101 and the like. These may include components such as input devices 103 such as voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like.

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107. The term "system memory" as used herein refers strictly to a physical article(s) of manufacture or the like.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like. The term "mass storage device" as used herein refers strictly to a physical article(s) of manufacture or the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor(s) 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may include only a few of the components described in connection with FIG. 1. For example, an electronic badge may be comprised of a coil of wire or the like along with a simple processing unit 107 or the like, the coil configured to act as power source 190 when in proximity to a card reader device or the like. Such a coil may also be configured to act as an antenna coupled to the processing unit 107 or the like, the coil antenna capable of radiating/receiving communications between the electronic badge and another device such as a card reader device. Such communications may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, machine, article of manufacture, or the like that is not a signal or carrier wave per se. Thus, computer-readable media, as the term is used herein, is intended to be and shall be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, one or more servers, network services such as an Internet services or corporate network services based on one or more computers, and the like, and/or any combination thereof. Thus, a computing device, as the term is used herein, is also intended to be and shall be interpreted as statutory subject matter.

System Overview

Figure 2:
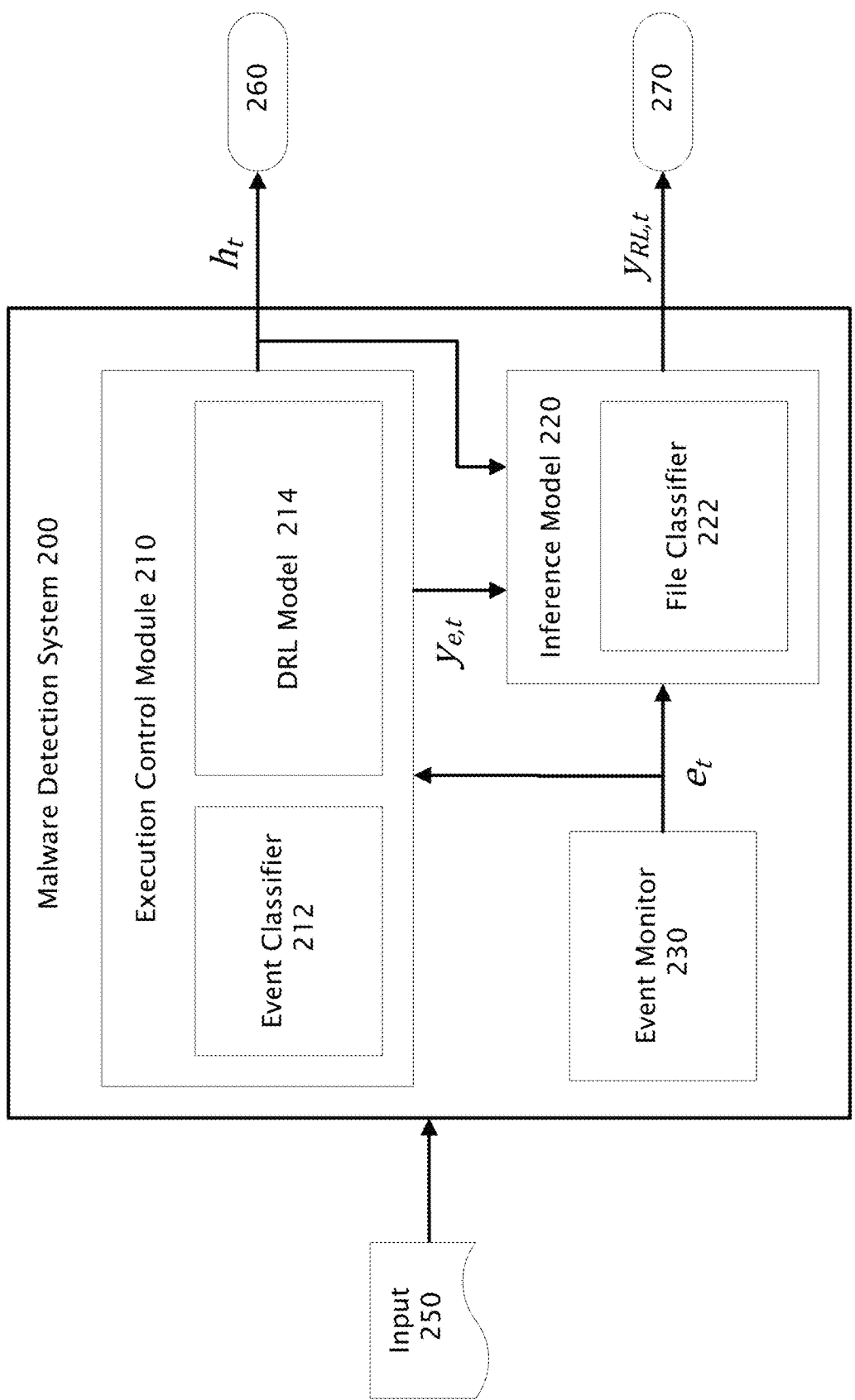
FIG. 2 is a block diagram showing an example malware detection system 200 based on the disclosed technologies.

FIG. 2 is a block diagram showing an example malware detection system ("MDS") 200 based on the disclosed technologies. MDS 200 typically comprises three main components: execution control module ("ECM") 210, inference module ("IM") 220, and event monitor ("EM") 230. Each of these components may be implemented in hardware or software or any combination thereof. Further, in other embodiments these components may alternatively be combined in any combination. In general, MDS 200 takes input 250 and produces outputs 260 and/or 270. Further, in some embodiments IM 220 is optional.

In general, input 250 is in the form of a file. The term "file" as used herein, including in the claim language, refers to any conventional executable file as well as any process, program, code, firmware, function, software, script (including non-executable script), object, data (e.g., an email attachment, web page, digital image, video, file, and any other form or container of digital information), and the like are all referred to herein as a "file" for simplicity. Further, the term "executing" as used herein, including in the claim language, refers to conventional executing as well as emulating, interpreting (as in interpreting non-executable script), and the like (all referred to herein as "executing" for simplicity). Such "executing" may be performed in any of a computer's system memory, a virtual machine, any isolated space, an emulator or simulator, an operating system, and/or the like.

In the context of monitoring by EM 230, such a file may be executed in a VM (or some other isolated space in which executing malware cannot harm the host computer), or directly on the host computer itself. EM 230 typically monitors the executing file for particular types of operations or events that it performs. For example, monitored events can include the performance of file input-output ("I/O") operations and the calling by the executing file of registry application programming interfaces ("APIs"), networking APIs, thread/process creation/control APIs, inter-process communication APIs, and debugging APIs. This list is non-limiting and any other events performed by the executing file that are determined to be relevant to detecting malware now and in the future may also be included. In general, the term "monitored event" as used herein, particularly in the claim language, refers to operations or events performed by the executing file that are considered relevant to detecting malware and typically include, but are not limited to, the example operations and events listed in above.

Further, in one embodiment, each type of event being monitored by EM 230 is designated by an event identifier ("ID") that uniquely identifies that event type from among all other monitored event types. For example, events of the type "file open" may be designated by an event ID of 54 (some unique identifier) while events of the type "file close" may be designated by an event ID of 55 (some other unique identifier). Such unique event IDs may take any suitable form, numeric or otherwise. In general, the output of EM 230 includes event IDs that identify the monitored events performed by an executing file. In one example, EM 230 provides the ID for each event $e_t$ in sequence to ECM 210 where $e_t$ indicates the monitored event at step t in the sequence of monitored events in the order they are performed by the executing file. In another example, EM 230 provides the sequence of event IDs one step at a time to ECM 210 and IM 220.

In one example, an event ID may include parameters of the corresponding event $e_t$. For example, if the event is a "file open" event, it may include a final name and path parameter(s) or the like. Any or all such parameters may, in this example, be referenced by or included with the event ID in any suitable form. Note that such events typically represent conventional operating system or other interfaces or the like, each with zero or more various parameters. Such interfaces and parameters are, in many cases, documented by their providers.

ECM 210 typically comprises two main components: event classifier ("EC") 212 and reinforcement learning model 214, a deep reinforcement learning mode ("DRL") in one embodiment. ECM 210 produces control decisions such as $h_t$ for continuing or halting of execution of a file. For example, if MDS 200 detects a malicious event sequence, these control decisions may be used to decide to halt execution of the file. In another example, these decisions 260 are provided to IM 220.

IM 220 typically comprises file classifier ("FC") 222 that employs a file classification model to aid in determining an improved likelihood that the file is malicious or benign. This likelihood $y_{RL,t}$ is generally provided as output 270 and is typically used to classify the executing file as malware (malicious) or benign. FC 222 and its operations are described in more detail in connection with FIG. 9.

Figure 3:
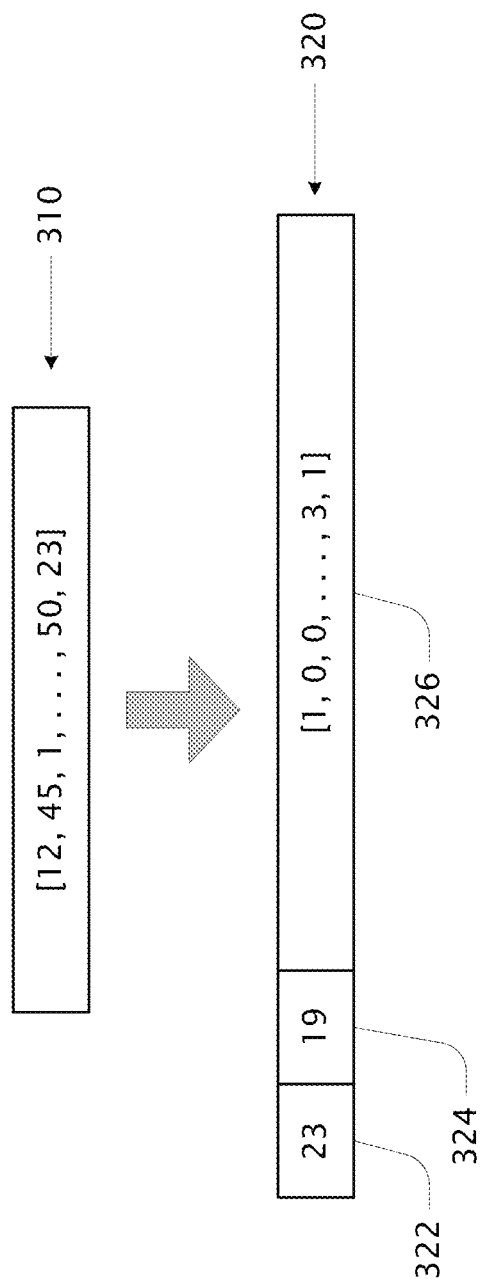
FIG. 3 is a diagram illustrating various data structures used in detecting malware.

FIG. 3 is a diagram illustrating various data structures used in detecting malware. Sequence log 310 represents a sequential log of event IDs that typically correspond to the monitored events in the order they are performed by the executing file. Further, a new instance of event state $s_t$ 320 is typically generated for each new monitored event. In general, event state $s_t$ corresponds to event $e_t$ at step t in the sequence of monitored events in the order they are performed by the executing file.

In one example of event states $s_t$ 320, each instance comprises three fields: (1) the event ID field 322 that typically comprises the event ID of the monitored event $e_t$ at step t in the sequence of monitored events in the order they are performed by the executing file; (2) the event position number or "step" field 324 of the monitored event that typically comprises the monitored event's position number or step t in the sequence of monitored events performed by the executing file since execution of the file began; and (3) the event histogram field 326 that typically includes a histogram of event IDs.

In one embodiment, the event histogram takes the form of an ordered array that represents all monitored event types. For example, given 100 different monitored event types, the first position in the ordered array represents event ID 1, the second position event ID 2, and so forth until the one-hundredth position in the ordered array which represents event ID 100. The event histogram is updated at each step t in the sequence of monitored events in the order they are performed by the executing file. In one example, all positions in the histogram are initially set to zero. Then, as illustrated in FIG. 3, if the monitored event at step 1 is of type 12 (e.g., event ID=12), the $12^{th}$ position in the ordered array (which represents event ID 12) is incremented by one indicating that a first instance of monitored event type 12 occurred in the sequence of monitored events. Next, if the monitored event at step 2 is of type 45 (e.g., event ID=45), the $45^{th}$ position in the ordered array (which represents event ID 45) is incremented by one indicating that a first instance of monitored event type 45 occurred in the sequence of monitored events. Finally, if the monitored event at step 19 is of type 23 (e.g., event ID=23), the $23^{rd}$ position in the ordered array (which represents event ID 23) is incremented by one indicating that an instance of monitored event type 23 occurred in the sequence of monitored events. Note that the example illustrated by histogram 326 indicates that, as of step 19, one instance of event ID 1 has been performed, zero instances of event types 2 and 3 have been performed, three instances of event type 99 have been performed, and one instance of event ID 100 has been performed.

In general, sequence log 310 and event state $s_t$ 320 are updated for each new monitored event that is performed by the executing file. In one example, the sequence log and/or event state are created and updated in real-time as monitored events are performed by the executing file. Additionally or alternatively, the sequence log may be created in real-time as monitored events are performed by the executing file, may be saved once execution is complete, and event state can be created any time after file execution using the saved sequence long.

The exact format and/or structure of sequence log 310 and/or event state 320 is not critical to the invention; any form and/or structure suitable for a particular implementation may be acceptable.

Figure 4:
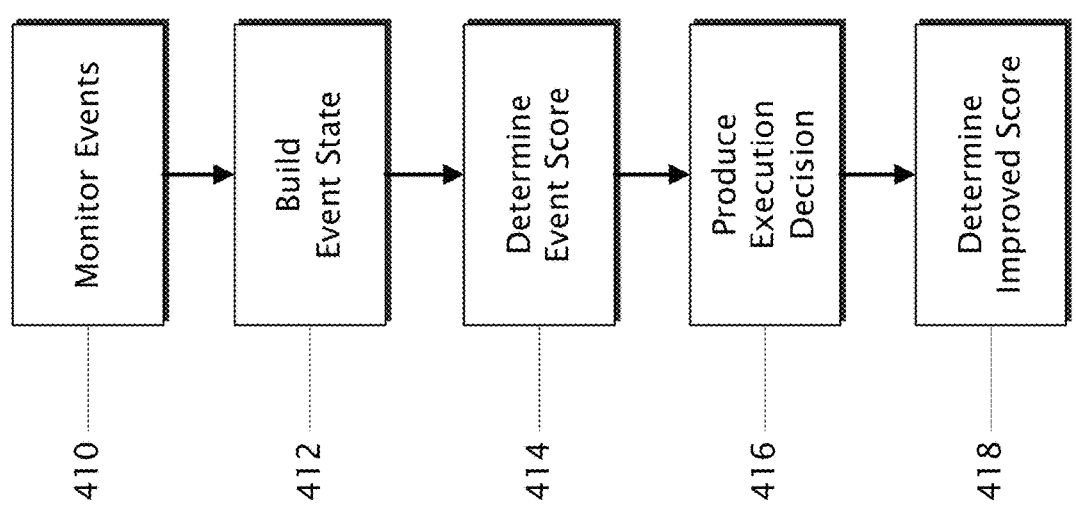
FIG. 4 is a block diagram showing an example method 400 for determining whether an executing file as malicious or benign.

FIG. 4 is a block diagram showing an example method 400 for determining whether an executing file is malicious or benign. In one embodiment, method 400 is performed by MDS 200 or the like. In one example, method 400 is performed as follows.

Block 410 typically indicates detecting the performance of monitored events by an executing file. In one example, monitored events are detected as described in connection with EM 230. Further, these monitored events are among the types of operations and events monitored by EM 230 as described above. Each monitored event $e_t$ is typically identified by an event identifier ("ID") that uniquely identifies that event type from among all other monitored event types. In one example, each event ID is provided in real-time as the monitored event is performed by the executing file. In another example, the sequence of event IDs is provided in the form of sequence log 310 or the like. The sequence of event IDs typically corresponds to the monitored events in the order they are performed by the executing file. After an event ID of the corresponding monitored event $e_t$ in the sequence is provided at step t, method 400 typically continues at block 412.

Block 412 typically indicates building, based on the provided event ID for most the recent event $e_t$ at step t in the sequence of monitored events in the order they are performed by the executing file, the corresponding event state $s_t$. In one example, a particular event state is built as described in connection with FIG. 3. Such event state may be built in real-time as the file is executed. Alternatively, such event state may be built from an event sequence log such as sequence log 310. Generally, only a single instance of event state is required. This instance $s_t$ is typically updated at each step t to correspond to the most recent event $e_t$. In this manner, memory requirements are minimized. Once event state $s_t$ is built or updated at step t in the sequence of monitored events, method 400 typically continues at step 414.

Block 414 typically indicates determining, in response to the provided event ID for the most recent event $e_t$ at step t in the sequence of monitored events in the order they are performed by the executing file, a likelihood of a malicious event sequence. This likelihood is typically determined by EC 212 and is referred to herein as an event score $y_{e,t}$ for monitored event $e_t$ at step t in the sequence of monitored events. Once event score $y_{e,t}$ is provided to DRL model 214 at step t in the sequence of monitored events, method 400 typically continues at block 416. The term "event score" as used here, particularly in the claim language, refers to a likelihood that a most recent event history indicates a malicious event sequence, where the likelihood may optionally represent a probability. EC 212 and its operations are described in more detail in connection with FIG. 9.

Block 416 typically indicates producing, in response to event state $s_t$ and event score $y_{e,t}$, an execution decision to either continue or halt execution of the file as described in more detail below. In one example, this decision is provided by MDS 200 as output 260. Once an execution control decision is produced at step t in the sequence of monitored events, method 400 optionally continues at block 418.

Block 418 typically indicates determining, in response to execution control decisions, an improved score that indicates the likelihood the executing file as malicious or benign. Such determining is typically performed by IM 220 if such a classification of the executing file is desired, otherwise this step may be excluded. Once the improved score is determined for step t, method 400 typically restarts for step t+1.

Figure 5:
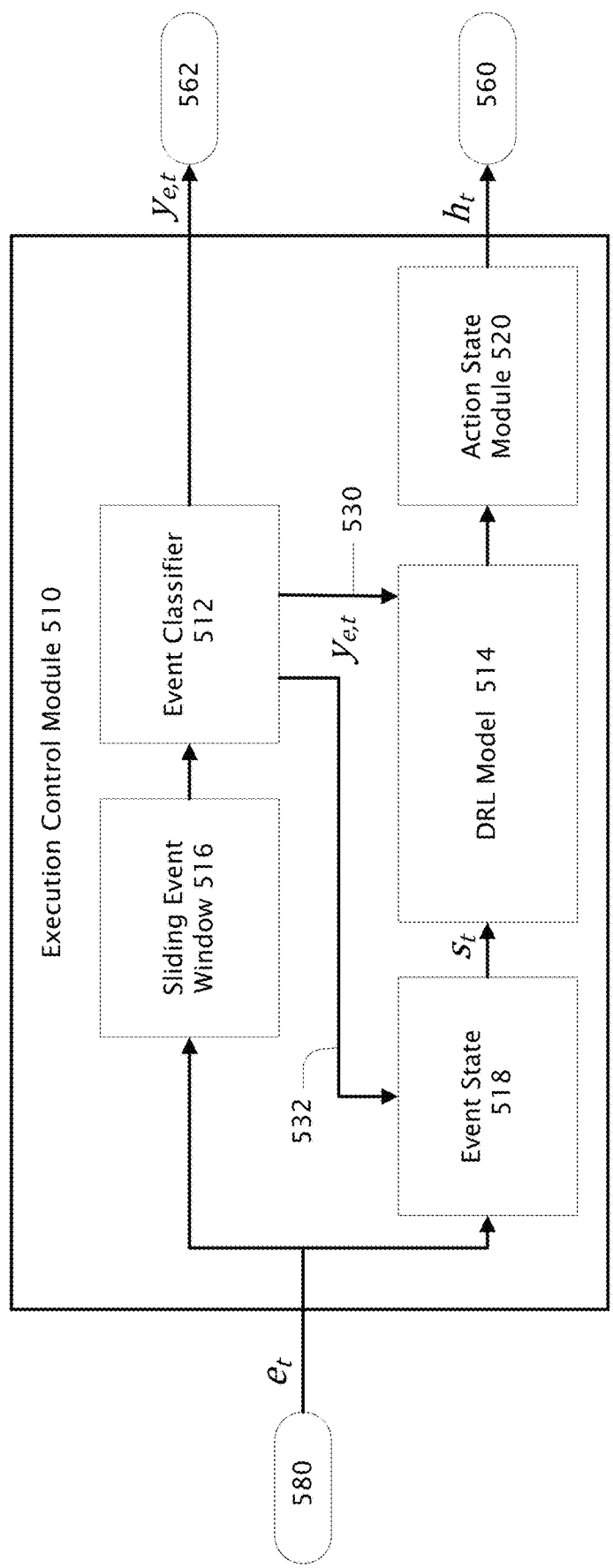
FIG. 5 is a block diagram showing an example execution control module 510.

FIG. 5 is a block diagram showing an example execution control module ("ECM") 510. ECM 510 is typically the same as, and performs the same functions as, ECM 210, although additional detail is illustrated in connection with ECM 510. In addition to the two main components, event classifier ("EC") 512 (same as EC 212) and deep reinforcement learning ("DRL") model 514 (same as DRL model 214), ECM 510 also comprises sliding event window ("SEW") 516, event state 518 (e.g., event state $s_t$ 320), and action state module ("ASM") 520. Input 580 $e_t$ is typically in the form of a sequence of event IDs, e.g., one event $e_t$ at each step t in the sequence of monitored events in the order they are performed by the executing file, such as from EM 230. And as with ECM 210, output 560 is typically the same as execution control decision $h_t$ 260 to either continue or halt execution of the file.

SEW 516 is typically a sliding window structure, a first-in, first-out ("FIFO") queue in one example, that is typically maintained by ECM 510 and that generally holds or indicates the E most recent event IDs that correspond to the sequence of monitored events in the order they are performed by the executing file. In one example, SEW 516 holds or indicates about 200 of the most recent event IDs. In other examples, SEW 516 holds or indicates some other number of the most recent event IDs. In one embodiment, the number E may be determined based on hyperparameter tuning which yields the best performance of EC 512 at predicting malicious event activity. If E is too small (i.e., the most recent event history in SEW 516 is too short), EC 512 may not process enough events to make a confident decision. Likewise if E is too large, the malicious activity may be too brief to be detected by EC 512 The term "most recent event history" as used herein, including in the claim language, refers to a list of event IDs of the n most recent monitored events in the sequence of monitored events in the order they are performed by the executing file, where n is some whole number. Here, SEW 516 lists the most recent event history in the form of the E most recent event IDs in the sequence of monitored events in the order they are performed by the executing file.

EC 512 is typically the same as, and performs the same functions as, EC 212. In one example, EC 512 is a two-stage neural network structure in which the first stage is a recurrent neural language model which generates a feature vector which is then input to a second classifier stage. The recurrent neural language model can be a recurrent neural network ("RNN") model. Alternatively, the recurrent neural language model can be a long short-term memory ("LSTM") model, a gated recurrent unit (GRU) or any suitable recurrent neural model. In another embodiment, the recurrent neural language model can be replaced with a sequential, convolutional neural network (CNN). The classifier stage can be any supervised classifier such as a logistic regression-based classifier, support vector machine, neural network or deep neural network.

EC 512 typically evaluates the most recent event history indicated by SEW 516 to determine an event score $y_{e,t}$ which indicates a likelihood that that the most recent event history indicates malicious activity where $e_t$ indicates the event at step t in the sequence of monitored events in the order they are performed by the executing file. When training system 200, score $y_{e,t}$ is typically provided to the reward function of DRL model 514 via path 530 to determine its output of at least one Q-value. When system 200 has already been trained and is being used for detecting malware, path 530 is typically not used and DRL model 514 determines its output of at least one Q-value based on event state $s_t$. In one example, event score $y_{e,t}$ is also provided as output 562. EC 512 and its operations are described in more detail in connection with FIG. 9. ES 518 is typically created by ECM 510 on a step-by-step basis from the sequence of event IDs resulting from the executing file as described in connection with block 412 of method 400 and as illustrated at least in FIG. 3.

DRL model 514 is typically the same as, and performs the same functions as, DRL model 214. In one example, DRL model 514 is implemented as a nonlinear approximator such as a deep neural network. In alternate examples, DRL model 514 may be implemented as a linear approximator or a quantum computer. In one example, the output of DRL model 514 may be in the form of a pair of Q-values for a given input event state $s_t$, with one Q-value of the pair for the continue action and the other Q-value of the pair for the halt action. Alternatively, a single Q-value could be produced by DRL model 514. The term "Q-value" as used herein, including in the claim language, refers to the expected utility of a given action $a_t$ while in a given state $s_t$ at step t.

In general, DRL model 514 must be trained prior to being used for malware detection. Particularly during training, DRL model 514 operates based on event states, actions, rewards, and policy. Event states, such as event state $s_t$ 518, are described in connection with FIG. 3. Actions are defined as "continue" and "halt" for a given input event state $s_t$ of the corresponding monitored event $e_t$. Rewards are generally constructed during training and are used internally by DRL model 514 to determine its output of at least one Q-value. Policy generally refers to the mapping function from event states to actions and is discussed further below.

In one embodiment, the reward function of DRL model 514, which is used during training of system 200, is defined as:

$$r_t = 0.5 - |y_{e,t} - L| \times e^{-\beta t}$$

where $r_t$ is the reward at step t and label $L \in \{0,1\}$ is defined as the true label of the training file where 0 indicates that the file is known to be benign and 1 indicates that the file is known to be malware. The decay factor $\beta$ is typically chosen experimentally and in one example is 0.01. The reward value $r_t$ is then used by DRL model 514 to determine its output of at least one Q-value. In the context of training, Q-values follow an optimal policy it and are defined in one example as:

$$Q^\pi(s_t, a_t) = \max_\pi \mathbb{E}[R_t | a_t, s_t, \pi]$$

where $R_t$ includes both the reward value $r_t$ at state $s_t$ and the accumulated rewards to be obtained in the future by taking a specific action $a_t$ at step t, by considering the policies from current state $s_t$ to its neighbors $s_t+1$ and so on. The actions here correspond to the execution control decisions of ECM 510 provided as output 560: that is, continue or halt execution of the file. The output of DRL model 514 is in the form of at least one Q-value.

In one example, the following algorithm describes a training process with example starting values for training DRL model 514. Other variations for training are also possible.

```
1:  Epochs: N ← 2000
2:  Batch Size: B_RL ← 50
3:  Decay Factor: β ← 0.01
4:  Initialize replay memory M with size μ ← 50000, DRL model with 3
    layers
5:  for n = 1 → N do
6:      Step t ← 0
7:      Randomly select an initial state s_t
8:      while !End of File do
9:          Q(s_t,a_t|θ_t) ← DRL(s_t)
10:         a_t* = arg max_a_t Q(s_t,a_t|θ_t)
11:         Perform action a_t*, generating next state s_t+1
12:         Push tuple (s_t,r_t,a_t*,s_t+1) into replay memory M
13.         for b = 1 → B_RL do
14:             Randomly select a tuple m from M
15:             s_t ← m(0); r_t ← m(1),s_t+1 ← m(3)
16:             Q(s_t,a_t|θ_t) DRL(s_t)
17:             Q(s_t+1,a_t+1|θ_t) ← DRL(s_t+1)
18:             Input y_e,t from Event Classifier
19:             r_t ← 0.5 - |y_e,t - label| × e^(-βt) where label is the true
                label of the training file
20:             Update Q̇(s_t,a_t|θ_t) in (5)
21:             Update the network by minimizing loss £(θ_t) in (4)
22:         end for
23:         t ← t + 1
24:     end while
25: end for
```

Once trained, system 200 can be used to detect malware. Once trained, the output of DRL model 514 may be in the form of a pair of Q-values that are based on a given input event state $s_t$, with one Q-value of the pair for the continue action and the other Q-value of the pair for the halt action. Alternatively, a single Q-value could be produced by DRL model 514.

ASM 520 typically filters Q-value output from DRL model 514 to produce execution control signals or decisions 560 for the file being executed. In one embodiment, ASM 520 filters Q-values based on a majority vote of the K most recent Q-values to determine if file execution should be continued or halted. In one example, ASM 520 filters about 200 Q-values or Q-value pairs to arrive at a decision. In other examples, ASM 520 filters other numbers of Q-values or Q-value pairs. In one embodiment, the number K may be determined based on hyperparameter tuning. In one embodiment, output 560 is provided as input to IM 220.

Figure 6:
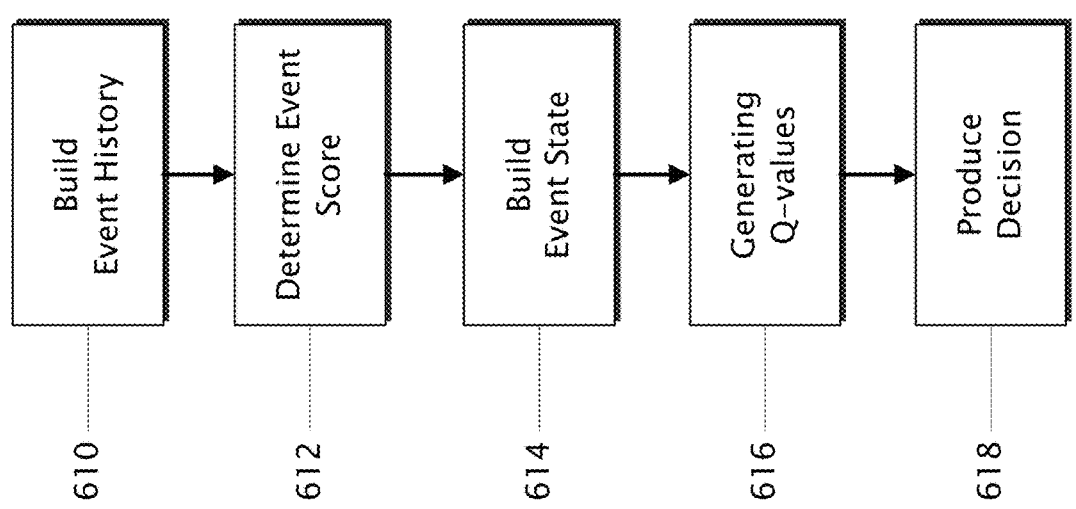
FIG. 6 is a block diagram showing an example method 600 for determining an event score and producing an execution decision to either continue or halt execution of the file.

FIG. 6 is a block diagram showing an example method 600 for determining an event score and producing an execution decision to either continue or halt execution of the file. Method 600 is typically consistent with method 400 but includes further detail. In one embodiment, method 600 is performed by ECM 510 or the like. In one example, method 600 is performed as follows.

Block 610 typically indicates building, in response to the latest monitored event, a most recent event history. The most recent event history is typically relative to the latest monitored event $e_t$ and is in the form of a sliding window structure, a first-in, first-out ("FIFO") queue in one example, such as that of SEW 516. The most recent event history is generally built to hold or indicate the E most recent event IDs that correspond to the sequence of monitored events in the order they were performed by the executing file. As the latest monitored event $e_t$ is received and added to a full history, the oldest event $e_{t-E}$ in the history is removed so as to consistently maintain the E most recent event IDs in the history. As such, the most recent event history is built or rebuilt as each new monitored event $e_t$ is received via input 580. In one example, the most recent event history is initially filled with padding events. In some examples, the most recent event history is only needed when training system 200 or when using event score histograms for training system 200 or detecting malware; otherwise, block 610 may not be required in method 600. Once the most recent event history is built for the latest monitored event $e_t$, method 600 typically continues at block 612.

Block 612 typically indicates determining, in response to the provided event ID for the most recent event $e_t$ at step t in the sequence of monitored events in the order they are performed by the executing file and based on the most recent event history of SEW 516, a likelihood that the most recent event history indicates malicious activity. In one example, this is accomplished by EC 512 evaluating the most recent event history of SEW 516 relative to the latest monitored event $e_t$ to determine an event score $y_{e,t}$ that the most recent event history relative to event $e_t$ indicates malicious activity where event $e_t$ indicates the event at step t in the sequence of monitored events in the order they are performed by the executing file. In some examples, event score $y_{e,t}$ is only needed (provided via path 532 for building event state) when training system 200 or when using event score histograms for training system 200 or detecting malware; otherwise, block 610 may not be required in method 600. Once event score $y_{e,t}$ that corresponds to the latest monitored event $e_t$ is determined, method 600 typically continues at block 614.

Block 614 typically indicates building, based on the provided event ID for most the recent event $e_t$ at step t in the sequence of monitored events in the order they are performed by the executing file, the corresponding event state $s_t$. In one example, a particular event state is built as described in connection with block 412 of FIG. 4. Further, event state $s_t$ can be built to include an additional event score histogram for each event type. For example, given 100 different monitored event types, then event state $s_t$ 320 can include a set of 100 event score histograms, one for each event type (not shown in FIG. 3). These event score histograms can be included in or otherwise indicated by event state 320 such that they can be used by DRL model 514.

In one example, each event score histogram in the set of event score histograms takes the form of an ordered array of buckets. Assuming, for example, that an event score indicates a probability between 0 and 1 that the most recent event history relative to event $e_t$ indicates malicious activity, then four buckets evenly divide that probability into fourths (e.g., [0-0.24], [0.25-0.49], [0.5-0.74], [0.75-1]) while ten buckets evenly divide that probability into tenths. Any number of buckets could be used although more buckets tend to require more memory. All buckets are typically initialized to zero.

Given that the most recent event $e_t$ is of type 1, for example, and a that the corresponding event score $y_{e,t}$ is in the form of a probability of 0.29, for example, then the second of four buckets in the four-bucket event score histogram for event type 1 is incremented by one so as to indicate that the event score $y_{e,t}$ of event $e_t$ is of type 1 and is between 0.25 and 0.49. Given ten bucket histograms, the third bucket (e.g., indicating 0.20-0.29) would be incremented. If, on the other hand, the type of event $e_t$ was type 87 instead of type 1, then the $87^{th}$ event score histogram would be the one modified. As such, when using even score histograms as part of event state $s_t$ 320, these histograms are updated as described above based on the event score $y_{e,t}$ that corresponds to the most the recent event $e_t$ at step t in the sequence of monitored events in the order they are performed by the executing file. In some example, a plurality of event score histograms can be combined into one histogram.

Block 616 typically indicates generating, based on the event state $s_t$ of latest monitored event $e_t$, a Q-value or Q-value pair for continuing and/or halting execution of the file. In one example, this is accomplished by DRL model 514 evaluating the event state $s_t$ of the latest monitored event $e_t$, such as event state 320, and its corresponding score $y_{e,t}$. In this example, the event state includes at least an event histogram such as described in connection with event state 320. The event state may additionally or alternatively include event score histograms as described above. Once the Q-value or Q-value pair that corresponds to the latest monitored event $e_t$ is generated, method 600 typically continues at block 618. When training system 200 as opposed to detecting malware once trained, this generating is typically based on the event state $s_t$ of latest monitored event $e_t$ and its corresponding score $y_{e,t}$.

Block 618 typically indicates producing, based on the K most recent Q-values or Q-value pairs, an execution decision as to whether or not the file should continue being executed or halted. In one embodiment, this is accomplished by ASM 520 filtering, based on a majority vote, the K most recent Q-values or Q-value pairs relative to the latest monitored event $e_t$ in order to produce a decision $h_t$ to either continue or halt execution of the file. Once decision $h_t$ is produced, method 600 may continue at block 610 with the next monitored event $e_{t+1}$ or decision $h_t$ may be processed further as described in FIG. 8.

Figure 7:
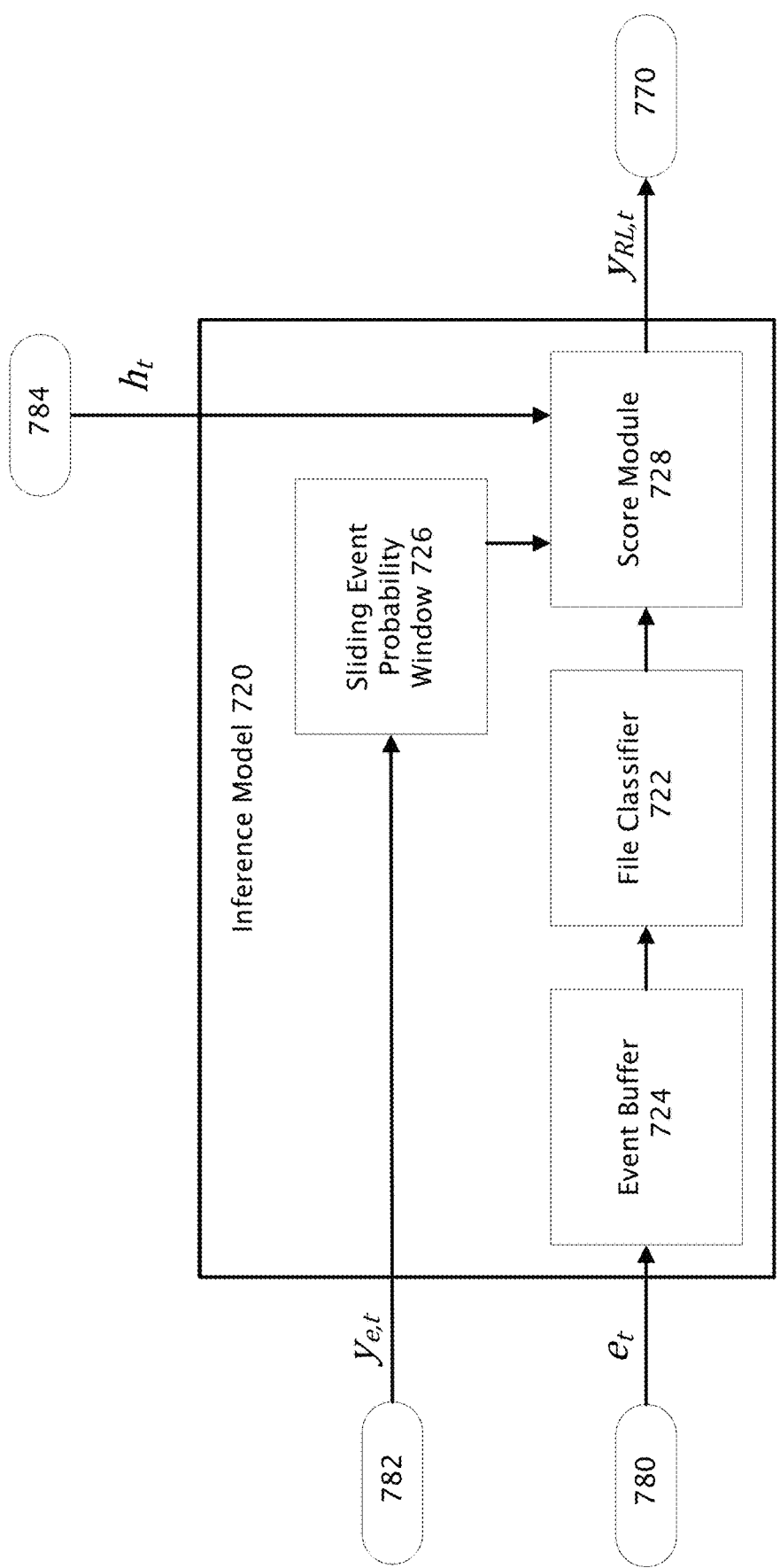
FIG. 7 is a block diagram showing an example inference model 720.

FIG. 7 is a block diagram showing an example inference model ("IM") 720 that is typically the same as, and performs the same functions as, IM 220, although additional detail is illustrated in connection with IM 720. In addition to the main component, file classifier ("FC") 722 (same as FC 222), IM 720 also comprises event buffer ("EB") 724, sliding event probability window ("SEPW") 726, and score module ("SM") 728. In some embodiments, EB 724 and FC 722 are optional and may not be included.

Input 780 $e_t$ (same as 580) typically comes from EM 230 and is typically in the form of a sequence of event IDs where $e_t$ indicates the event at step t in the sequence of monitored events in the order they are performed by the executing file. Input 782 $p_{e,t}$ typically comes from output 562 of ECM 510 and is typically event score $y_{e,t}$ that the most recent event history relative to event $e_t$ at step t indicates malicious activity. Input 784 $h_t$ typically comes from output 560 of ECM 510 and is typically the halt-or-continue decision relative to event $e_t$ at step t. And as with MDS 200, output 770 is typically the same as output 270 that is typically used to classify the executing file as malware (malicious) or benign.

EB 724 is typically an event buffer structure, a queue in one example, that is typically maintained by IM 720 and that generally holds or indicates a first event history comprising the V first event IDs received at input 780 from the sequence of event IDs that corresponds to the monitored events in the order they are performed by the executing file. In one example, EB 724 holds or indicates the first 200 event IDs of the first 200 monitored events (as opposed to the most recent monitored events) in the order they are performed by the executing file. In other examples, EB 724 holds or indicates some other number of event IDs. In one embodiment, the number V may be determined based on hyperparameter tuning. The term "first event history" as used herein, including in the claim language, refers to a list of the first V monitored events in the sequence of monitored events in the order they were performed from the beginning of file execution.

FC 722 is typically the same as, and performs the same functions as, FC 222. In one example, FC 722 is a two-stage neural network structure in which the first stage is a recurrent neural language model which generates a feature vector which is then input to the second classifier stage. The recurrent neural language model can be a recurrent neural network ("RNN") model. Alternatively, the recurrent neural language model can be a long short-term memory ("LSTM") model, a gated recurrent unit (GRU) or any suitable recurrent neural model. In another embodiment, the recurrent neural language model can be replaced with a sequential, convolutional neural network (CNN). The classifier stage can be any supervised classifier such as a logistic regression-based classifier, support vector machine, neural network or deep neural network.

FC 722 typically evaluates the first event history comprising the V first monitored event IDs of EB 724 in order to determine a file score $y_{f,t}$ that the file being executed is malicious or benign in the sequence of monitored events in the order performed by the executing file. File score $y_{f,t}$ is typically provided to SM 728. FC 722 and its operations are described in more detail in connection with FIG. 9.

SEPW 726 is typically a sliding window structure, a first-in, first-out ("FIFO") queue in one example, that is typically maintained by IM 720 and that generally holds or indicates a most recent event score history comprising the W most recent event scores received from input 782 and that correspond to the W most recent event IDs from the sequence of event IDs that corresponds to the monitored events in the order they are performed by the executing file. In one example, SEPW 726 holds or indicates about 200 event scores. In other examples, SEPW 726 holds or indicates some other number of event scores. In one embodiment, the number W may be determined based on hyperparameter tuning. The term "most recent event score history" as used herein, including in the claim language, refers to a list of event scores that correspond to the W most recent monitored events in the sequence of monitored events in the order they are performed by the executing file.

SM 728 typically computes, in response to $h_t$ input 784 indicating a decision to halt execution, a final improved file classifier score $y_{RL,t}$ for the file being executed. In one example, this score is an improved score that the executing file is malicious or benign, is relative to step t in the sequence of monitored events in the order they are performed by the executing file, and is based on three inputs: (1) score $y_f$ from FC 722, (2) the W most recent event scores relative to step t from SEPW 726, and (3) decision $h_t$ from input 784 which may be considered too noisy to be used directly. In one example, the computation is performed as follows: In response to $h_t$ indicating a decision to halt execution, if $y_f > 0.5$ then the executing file is more likely malicious, hence $y_{RL,t}$ is set to the maximum $y_{e,t}$ from the W most recent event scores; otherwise, if $y_f \leq 0.5$ then the executing file is more likely benign, hence $y_{RL,t}$ is set to the minimum $y_{e,t}$ from the W most recent event scores.

Improved score $y_{RL,t}$ is typically provided as output 770 and indicates the improved score that the executing file is malware (malicious).

Figure 8:
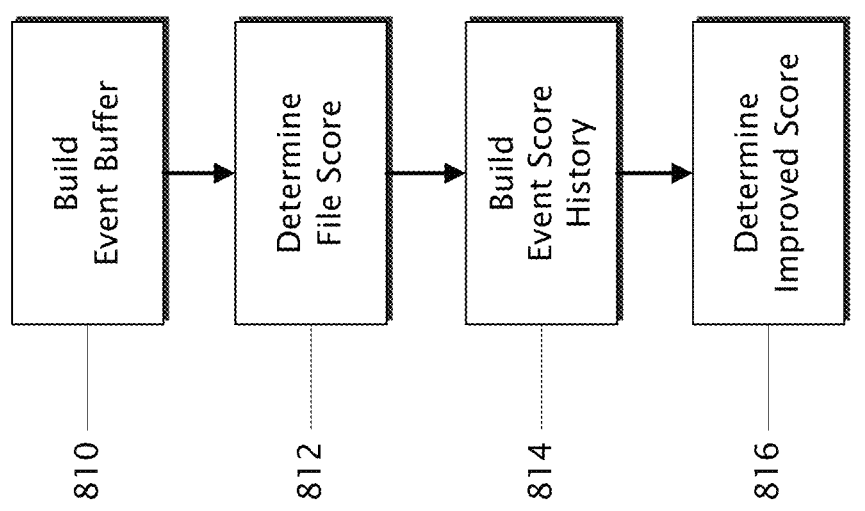
FIG. 8 is a block diagram showing an example method 800 for determining an improved score that indicates the likelihood the executing file as malicious or benign

FIG. 8 is a block diagram showing an example method 800 for determining an improved score that indicates the likelihood the executing file as malicious or benign. In one embodiment, method 800 is performed by IM 720 or the like. In one example, method 800 is performed as follows.

Block 810 typically indicates building, based the V first monitored events in the order they were performed from the beginning of file execution, a first event history. The first event history takes the form of a queue in one example that holds or indicates the V first monitored events, such as EB 724. The first event history is generally built to hold or indicate the first V monitored events in the sequence of monitored events in the order they were performed from the beginning of file execution. For example, the first event history typically consists of event IDs 1 through V. In one example, the queue is initially filled with padding events. Once the first event history is built it typically remains unchanged, and method 800 typically continues at block 812.

Block 812 typically indicates determining, in response to receiving the latest monitored event $e_t$ at step t and based on the first event history of EB 724, a file score $y_f$ that indicates a likelihood that the executing file is malicious. In one example, this is accomplished by FC 722 evaluating the first event history of EB 724 to determine the file score $y_f$ that the executing file is malicious. Once file score $y_f$ is determined, method 800 typically continues at block 814. The steps of blocks 810 and 812 are optional and may not be included in all embodiments.

Block 814 typically indicates building, based on score $y_{e,t}$ corresponding to the latest monitored event $e_t$, a most recent score history. The most recent event score history is typically relative to the latest monitored event $e_t$ and takes the form of a sliding window structure, a first-in, first-out ("FIFO") queue in one example, such as SEPW 726. The most recent event score history is generally built to hold or indicate the W most recent event scores received from input 782 and that correspond to the W most recent event IDs from the sequence of event IDs that corresponds to the monitored events in the order they are performed by the executing file. As the latest score $y_{e,t}$ is received and added to a full history, the oldest score $y_{e,t-W}$, in the history is removed so as to consistently maintain the W most recent event scores in the history. As such, the most recent event history is built or rebuilt as each new monitored event $e_t$ is received via input 780. In one example, the most recent event history is initially filled with padding events. Once the most recent score history is built for the latest score $y_{e,t}$, method 800 typically continues at block 816.

Block 816 typically indicates determining an improved score that indicates the likelihood the executing file as malicious or benign. In one example, such determining is performed by SM 728 based on the inputs and computation described in connection with SM 728. Once the improved score is determined, method 800 is typically complete.

Figure 9:
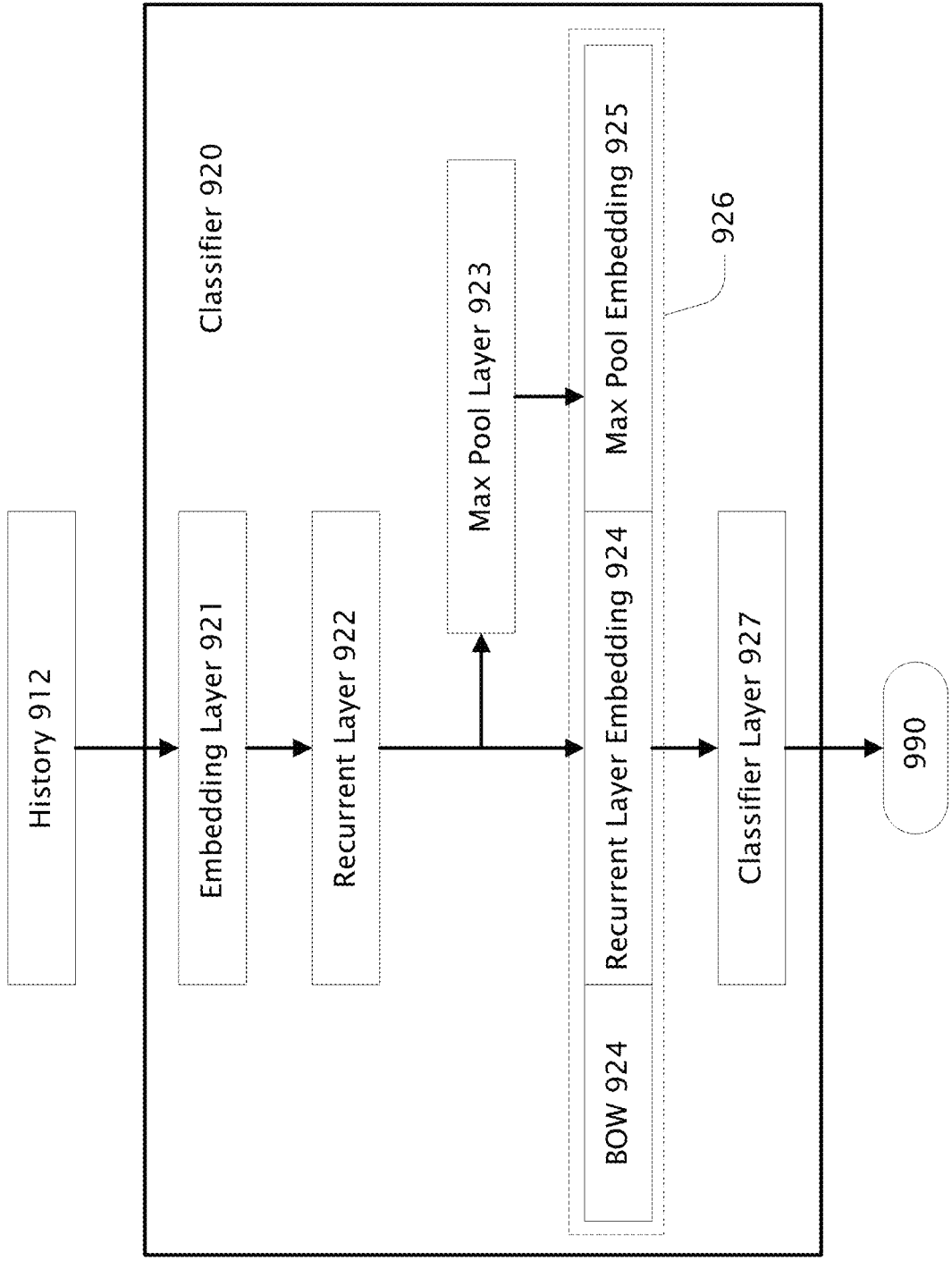
FIG. 9 is a block diagram showing an example classifier 920 that may be used to implement event classifier 512 and/or file classifier 722.

FIG. 9 is a block diagram showing an example classifier 920 that may be used to implement event classifier 512 and/or file classifier 722. History 912 is generally considered separate input to classifier 920 and indicates a most recent event history, such as provided by SEW 516, in the case of event classifier 512 or a most recent event score history, such as provided by SEPW 726, in the case of file classifier 726. In one embodiment, the appropriate history at each step t is provided as input to embedding layer 921 and the result is then provided as input to recurrent layer 922. In one example, recurrent layer 922 is implemented as a recurrent neural network ("RNN"). Next, the recurrent layer's hidden state is provided as input to max-pool layer 923 which is typically better able to detect malicious activity within the history.

Next, a feature vector 926 is formed comprising: (1) a bag of words ("BOW") representation of the history; (2) the final hidden state of recurrent layer 922 which is recurrent layer embedding 924; and (3) the output of max-pool layer 923 which is max-pool embedding 925. In various examples, feature vector 926 can be a sparse binary feature vector or a dense binary feature vector. In one example, BOW 924 of the feature vector is made up of 114 features, recurrent layer embedding 924 is made up of 1500 features, and max-pool embedding 925 is made up of 1500 features resulting in feature vector 926 of size 3114×1. In other examples, other numbers of features may be used. In other examples, the sparse binary feature may only contain Max Pool Embedding 925.

Finally, feature vector 926 is provided as input to classifier layer 927. Layer 927 can be typically any supervised classifier such as a logistic regression-based classifier, support vector machine, neural network, shallow neural network, or deep neural network. The output of classifier layer 927 is typically a sigmoid function. In particular, as event classifier 512, the output is event score $y_{e,t}$ which indicates a likelihood that the most recent event history indicates malicious activity where $e_t$ indicates the event at step t in the sequence of monitored events in the order they are performed by the executing file. Alternatively, file classifier 722, the output is file score $y_f$ which indicates a likelihood that the executing file is malicious. Such scores are provided as classifier output 990.

CONCLUSION

In a first example, a method is performed on at least one computing device that includes at least one processor and memory, the method comprising: executing, by the at least one computing device, at least a portion of a file; monitoring, by the at least one computing device, execution of the file sufficient to identify a sequence of monitored events performed by the executing file; building, by the at least one computing device based on the monitored events, an event state that comprises an event histogram; generating, by the at least one computing device based on the event state, at least one Q-value; producing, by the at least one computing device based on the at least one Q-value, a decision to continue executing the file or to halt executing the file; and halting, by the at least one computing device in response to at least the decision to halt executing the file, the execution of the at the least the portion of the file.

In a second example, there is at least one computing device comprising: at least one processor and memory that is coupled to the at least one processor and that includes computer-executable instructions that, based on execution by the at least one processor, configure the at least one computing device to perform actions comprising: executing, by the at least one computing device, at least a portion of a file; monitoring, by the at least one computing device, execution of the file sufficient to identify a sequence of monitored events performed by the executing file; building, by the at least one computing device based on the monitored events, an event state that comprises an event histogram; generating, by the at least one computing device based on the event state, at least one Q-value; producing, by the at least one computing device based on the at least one Q-value, a decision to continue executing the file or to halt executing the file; and halting, by the at least one computing device in response to at least the decision to halt executing the file, the execution of the at least the portion of the file.

In a third example, at least one computer-readable medium that includes computer-executable instructions that, based on execution by at least one computing device, configure the at least one computing device to perform actions comprising: executing, by the at least one computing device, at least a portion of a file; monitoring, by the at least one computing device, execution of the file sufficient to identify a sequence of monitored events performed by the executing file; building, by the at least one computing device based on the monitored events, an event state that comprises an event histogram; generating, by the at least one computing device based on the event state, at least one Q-value; producing, by the at least one computing device based on the at least one Q-value, a decision to continue executing the file or to halt executing the file; and halting, by the at least one computing device in response to at least the decision to halt executing the file, the execution of the at least the portion of the file.

In the first, second, and third examples: the generating is further based on the event histogram; the generating is further based on a set of event score histograms that correspond to the monitored events; the generating is further based on a step number of a monitored event that corresponds to the event state; the generating is further based on an identifier of a monitored event that corresponds to the event state; the reinforcement learning model is a deep reinforcement learning model; and/or the method and actions further comprise: building, by the at least one computing device based on the event score, an event score history; and determining, by the at least one computing device based on the event score history and the decision, an improved score that indicates the likelihood the executing file is malicious or benign, where the halting is further based on the improved score indicating that the executing file is malicious.

The invention claimed is:

1. A method performed on at least one computing device that includes at least one processor and memory, the method comprising:
   executing at least a portion of a file;
   identifying, during execution of the at least the portion of the file, a sequence of monitored events, the sequence of monitored events having a sequence length that varies according to a content of the file, the sequence of monitored events comprising any type of event;
   building, based on the monitored events, an event state that comprises an event histogram;
   generating, based at least on the event state, at least one value from a reinforcement learning model, the at least one value representing an expected utility of halting the execution of the at least the portion of the file; and
   halting, based on the at least one value, the execution of the at least the portion of the file.

2. The method of claim 1 where the generating is further based on the event histogram.

3. The method of claim 1 where the generating is further based on a set of event score histograms that correspond to the monitored events.

4. The method of claim 1 where the generating is further based on a step number of a monitored event that corresponds to the event state.

5. The method of claim 1 where the generating is further based on an identifier of a monitored event that corresponds to the event state.

6. The method of claim 1 wherein the reinforcement learning model is a deep reinforcement learning model, the method further comprising, prior to generating the at least one value:
   determining an event score associated with a most recent event in the sequence of monitored events, the event score representing that a most recent event history indicates a malicious event sequence;
   providing the event score to the deep reinforcement learning model;
   wherein generating the at least one value further comprises generating the at least one value based on the event score; and
   wherein the at least one value comprises at least one Q-value for halting the execution.

7. The method of claim 1 further comprising:
   building, by the at least one computing device based on an event score, an event score history; and
   determining, by the at least one computing device based at least on the event score history, an improved score that indicates a probability that the file is malicious, where the halting is further based on the improved score indicating that the file is malicious.

8. At least one computing device comprising:
   at least one processor and memory that is coupled to the at least one processor and that includes computer-executable instructions that, based on execution by the at least one processor, configure the at least one computing device to perform actions comprising:
   executing at least a portion of a file;
   identifying, during execution of the at least the portion of the file, a sequence of monitored events, the sequence of monitored events having a sequence length that varies according to a content of the file, the sequence of monitored events comprising any type of event;
   building, based on the monitored events, an event state that comprises an event histogram;
   generating, based at least on the event state, at least one value from a reinforcement learning model, the at least one value representing an expected utility of halting the execution of the at least the portion of the file; and
   halting, based on the at least one value, the execution of the at least the portion of the file.

9. The at least one computing device of claim 8 where the generating is further based on the event histogram.

10. The at least one computing device of claim 8 where the generating is further based on a set of event score histograms that correspond to the monitored events.

11. The at least one computing device of claim 8 where the generating is further based on a step number of a monitored event that corresponds to the event state.

12. The at least one computing device of claim 8 where the generating is further based on an identifier of a monitored event that corresponds to the event state.

13. The at least one computing device of claim 8 where the reinforcement learning model is a deep reinforcement learning model.

14. The at least one computing device of claim 8, the actions further comprising:
   building, by the at least one computing device based on an event score, an event score history; and determining, by the at least one computing device based at least on the event score history, an improved score that indicates a probability that the file is malicious, where the halting is further based on the improved score indicating that the file is malicious.

15. At least one computer-readable medium that includes computer-executable instructions that, based on execution by at least one computing device, configure the at least one computing device to perform actions comprising:
   executing at least a portion of a file;
   identifying, during execution of the at least the portion of the file, a sequence of monitored events, the sequence of monitored events having a sequence length that varies according to a content of the file, the sequence of monitored events comprising any type of event;
   building, based on the monitored events, an event state that comprises an event histogram;
   generating, based at least on the event state, at least one value from a reinforcement learning model, the at least one value representing an expected utility of halting the execution of the at least the portion of the file; and
   halting, based on the at least one value, the execution of the at least the portion of the file.

16. The at least one computer-readable medium of claim 15 where the generating is further based on the event histogram.

17. The at least one computer-readable medium of claim 15 where the generating is further based on a set of event score histograms that correspond to the monitored events.

18. The at least one computer-readable medium of claim 15 where the generating is further based on a step number or an identifier of a monitored event that corresponds to the event state.

19. The at least one computer-readable medium of claim 15 where the reinforcement learning model is a deep reinforcement learning model.

20. The at least one computer-readable medium of claim 15, the actions further comprising:
   building, by the at least one computing device based on an event score, an event score history; and
   determining, by the at least one computing device based on the event score history and the decision, an improved score that indicates a probability that the file is malicious, where the halting is further based on the improved score indicating that the file is malicious.

* * * * *